United States Patent
Zhang et al.

(10) Patent No.: US 12,056,881 B2
(45) Date of Patent: Aug. 6, 2024

(54) GENERATING DYNAMIC VIRTUAL MASK LAYERS FOR CUTOUT REGIONS OF DISPLAY PANELS

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/917,508

(22) PCT Filed: Apr. 8, 2020

(86) PCT No.: PCT/CN2020/083629
§ 371 (c)(1),
(2) Date: Oct. 6, 2022

(87) PCT Pub. No.: WO2021/203257
PCT Pub. Date: Oct. 14, 2021

(65) Prior Publication Data
US 2023/0154440 A1    May 18, 2023

(51) Int. Cl.
*G06T 7/11* (2017.01)
*G06T 1/20* (2006.01)
(Continued)

(52) U.S. Cl.
CPC ............... *G06T 7/174* (2017.01); *G06T 1/20* (2013.01); *G06T 7/11* (2017.01); *G09G 5/377* (2013.01);
(Continued)

(58) Field of Classification Search
CPC .. G06T 7/11; G06T 7/174; G06T 1/20; G09G 5/377; G09G 5/026; G09G 5/14; G09G 2300/023; H04N 7/144
See application file for complete search history.

(56) References Cited

U.S. PATENT DOCUMENTS 10,986,255 B2    4/2021  Evans, V et al.
11,005,073 B2    5/2021  Wang
(Continued)

FOREIGN PATENT DOCUMENTS

CN    108598133 A    9/2018
CN    108919545 A    11/2018
(Continued)

OTHER PUBLICATIONS

Supplementary European Search Report—EP20929754.8—Search Authority—Munich—Aug. 17, 2023.
(Continued)

*Primary Examiner* — Hau H Nguyen
(74) *Attorney, Agent, or Firm* — QUALCOMM Incorporated (57) ABSTRACT

Certain aspects of the present disclosure provide methods and apparatus for generating, in a display panel, a virtual mask layer around a cutout region for a front camera. The front camera may be positioned under the display panel and receive light through the cutout region. The mask layer may hide defects of the cutout region that does not have functional pixels. The disclosed techniques may improve aesthetic appearance of displays having punch-hole cameras with reduced hole sizes and increased production quality conformance rate.

16 Claims, 6 Drawing Sheets

(51) Int. Cl.
  *G06T 7/174* (2017.01)
  *G09G 5/377* (2006.01)
  *H04N 7/14* (2006.01)
(52) U.S. Cl.
  CPC ......... *G09G 2340/12* (2013.01); *H04N 7/144* (2013.01)

(56) References Cited

U.S. PATENT DOCUMENTS

| | | | |
|---|---|---|---|
| 11,011,588 B2 | 5/2021 | Wu | |
| 11,043,651 B2 | 6/2021 | Yu | |
| 2019/0095095 A1* | 3/2019 | McCarthy | G06F 3/0482 |
| 2019/0187849 A1 | 6/2019 | Lee et al. | |
| 2020/0134282 A1 | 4/2020 | Tian | |
| 2020/0373519 A1 | 11/2020 | Wang | |
| 2021/0084236 A1 | 3/2021 | Han | |
| 2021/0133935 A1 | 5/2021 | Yoshida et al. | |
| 2021/0134889 A1 | 5/2021 | Zhang et al. | |
| 2021/0151523 A1 | 5/2021 | Zhou | |
| 2021/0193957 A1 | 6/2021 | Wang | |
| 2021/0200263 A1 | 7/2021 | Hu et al. | |
| 2021/0202535 A1 | 7/2021 | Sun et al. | |
| 2021/0208633 A1 | 7/2021 | Ma et al. | |
| 2021/0319563 A1 | 10/2021 | Zhang et al. | |

FOREIGN PATENT DOCUMENTS

| | | |
|---|---|---|
| CN | 109862161 A | 6/2019 |
| EP | 3282441 A2 | 2/2018 |
| JP | 2011082798 A | 4/2011 |
| WO | 2008048859 A2 | 4/2008 |
| WO | 2014078117 A1 | 5/2014 |
| WO | 2019111912 A1 | 6/2019 |

OTHER PUBLICATIONS

International Search Report and Written Opinion—PCT/CN2020/083629—ISA/EPO—Jan. 4, 2021.

* cited by examiner

GENERATING DYNAMIC VIRTUAL MASK LAYERS FOR CUTOUT REGIONS OF DISPLAY PANELS

CROSS REFERENCE TO RELATED APPLICATION(S)

This application is National Stage Application filed under 35 U.S.C. § 371 of PCT International Application No. PCT/CN2020/083629, entitled "GENERATING DYNAMIC VIRTUAL MASK LAYERS FOR CUTOUT REGIONS OF DISPLAY PANELS" and filed Apr. 8, 2020, which is expressly incorporated by reference herein in its entirety.

TECHNICAL FIELD

The present disclosure relates generally to display panels and, more particularly, to one or more techniques for display or graphics processing for display panels.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

Portable computing devices, including smartphones, tablets, and wearable devices, may present graphical content on a display. Very often, these devices include a front camera (e.g., a camera facing toward the user) integrated with the display for video conferencing, video chat, taking photographs of one's self, and other activities that involves the user. Recent market demands have driven manufacturers to adopt displays with minimum bezels for aesthetics. Consequently, a display often spans edge-to-edge on a device. As such, the front camera usually must be included within the periphery of the display.

In some cases, the display includes a cutout region that allows the integrated front camera to receive light. The cutout region is often created using a physical removal process that removes existing materials of the display. Due to random errors that occurs during manufacturing, such physical removal process does not always produce uniform, consistent, or precise results, and negatively affects the aesthetics of the display. It should be noted that such a cutout region may be included in a display for other purposes than a front camera, and that a display may have more than one cutout region.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

Certain aspects of the present disclosure provide a computing device including a display. The display may include a region that does not have functional pixels. For example, the region may be physically cutout from the display. The computing device further includes a non-volatile memory and a processor. The processor is configured to retrieve, from the non-volatile memory, region information indicative of dimensions, shape, geometry, and/or a position of the region on the display. The processor may generate a mask layer having a size, shape, and position based on the region information and compose an image based on the mask layer and one or more layers. The mask layer may prevent a display of any portion of the one or more layers that overlap with the mask layer. The processor may output the composed image on the display. As such, the mask layer, having the region therein, may present an appearance of a perfect cutout region that hides imperfections of the physical removal of the region.

Certain aspects of the present disclosure provide a computing device comprising means for displaying. The computing device also includes means for retrieving region information indicative of dimensions, geometry, and a position of a region that does not have functional pixels. The computing device further includes means for generating a first mask layer having a size, shape, and position based on the retrieved region information. The computing device includes means for composing a first image based on the mask layer and one or more layers. The computer device may include means for generating a second mask layer based on the region information and composing a second image based on at least the second mask layer. The computer device may further include means for outputting the first image and the second image on the means for displaying.

Certain aspects of the present disclosure provide a method for operating a computing device as discussed herein. Certain aspects of the present disclosure provide a non-transitory computer readable medium storing instructions that when executed by a computing device as discussed herein cause the computing device to operate as discussed herein.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like numerals indicate like elements.

DETAILED DESCRIPTION

In general, aspects disclosed herein provide techniques for improving visual quality of a display that includes a cutout region, such as for an integrated camera or other purposes. For example, the disclosed techniques have display panels dynamically adapt to regions that do not have functional pixels and form a mask layer to hide defects of the regions.

Using conventional techniques, display panels often include a physical cutout region (e.g., a punched hole), such as to allow a front camera to receive light. But such a cutout region often includes manufacturing errors in terms of shape, dimensions, and/or position. To hide such errors, the conventional techniques further apply a physical mask layer, such as a painted black circle having a greater diameter than the cutout region such that the cutout region together with the mask layer would appear to have a perfect round aperture for the front camera. Yet even with the greater diameter, the physical mask layer may still fail to fully cover or hide the manufacturing errors, resulting in a less appealing display. And such conventional masking techniques create black circles much larger than the camera lens. Aspects discussed herein overcome these shortcomings and provides a virtual mask layer having a geometry and/or position that can be adjusted based on each cutout region specific to each display panel, to achieve an improved aesthetic appearance.

In some cases, it is desirable to include, in devices, edge-to-edge display panels with the least impact possible from inclusion of the front camera. As such, the perceivable hole size of the front camera is a key performance index (KPI) and selling point. Very often, to avoid blocking light from reaching the front camera through the display, holes are created (e.g., punched) in the display panels using mechanical methods that remove existing and functioning pixels. In other embodiments, however, the removal may be limited to certain opaque or translucent backing (such as a backlight or a reflective layer) of the display panels and clear or transparent pixels may remain (yet still be considered as non-functional pixels).

During production, the quality of the punch hole (or otherwise removing the functional pixels in the display panel) in the final releasable products is usually limited by three conflicting factors or goals: (1) conformance rate of the display panel punch hole; (2) hole diameter and size; and (3) conformance rate of the assembly of the display panel with the front camera in the completed device. The conformance rates often decrease (i.e., rejection rates increase) as the hole diameter decreases (i.e., precision requirements increase). Certain aspects herein resolve these conflicts and may obtain these goals simultaneously.

Certain aspects provide a method for dynamically adjusting a virtual mask layer (generally referred to as "mask layer" herein) for each display panel including creating a slightly larger virtual aperture to hide imperfections of a physically removed portion or region in a display panel. The disclosed mask layer may reduce device failure rate by accepting manufacturing variability while still obtaining the aesthetics goal. In some embodiments, the method includes offline measurements of the physical cutout region of each display panel. The measured cutout region information may then be used to generate the mask layer that is displayed on the display panel to simulate a conventional physical mask layer. For example, the method may include applying the virtual mask layer upon starting of the device such that the mask layer displays black pixels to show an aesthetic (and relatively small) shape around the front camera.

In some examples, certain aspects may use an electronic microscope in the production line to measure the shape and position of the cutout region for each display panel. The measurements may be saved for each display panel and may be used to generate a corresponding mask layer. For example, the mask layer may include information to control the display panel, such as, "1" for the measured cutout region, and "0" for the original, non-cutout region. As disclosed, the shape, diameter, and position of the mask layer may be adjusted adaptively based on the actual measured cutout region tailored to each display panel.

In some examples, the mask layer applied to the display is a type of frame layer. In some examples, a display processor may perform compositing (or blending) of pixel data from different frame layers to generate a display image for presentment via the display. As used herein, a frame layer (sometimes referred to as a "layer") refers to a layer that is combined with one or more other frame layers into a single layer (e.g., the display image). A mask layer may be a transparent layer (e.g., without altering existing display image) with a mask region that is opaque and displaying the darkest color (e.g., black) of the display panel. The mask layer is overlaid on one or more other frame layers such that when combined with the one or more other frame layers into a single layer, the mask region appears to be the aperture of the front camera and presents a virtual cutout shape hiding manufacturing imperfections.

Certain aspects herein, including certain devices, and systems therefore enjoy several technical advantages over the conventional masking methods. First, the disclosed techniques enable manufacturers to continuously pursue a reduced size of the cutout region without sacrificing the conformance rates for production. Second, the disclosed techniques reduce device failure rate caused by manufacturing errors by adaptively adjusting to such errors and achieving similar aesthetic results. Third, the disclosed techniques provide additional flexibility for various display panel layout designs with cutout region(s) when more complicated cutout shapes, sizes, or locations may be introduced in the future for multiple cameras, sensors, or for other reasons.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for generating a virtual mask layer around a cutout region, such as for a front camera. For example, a front camera may be positioned under the display and receive light through the cutout region. The mask layer may hide defects of the region that does not have functional pixels. The disclosed techniques may improve aesthetic appearance of displays having cutout regions with reduced size and increase production quality conformance rate. For example, certain aspects provide techniques for graphics and/or display processing in any device that utilizes a display with a region not having functional pixels. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
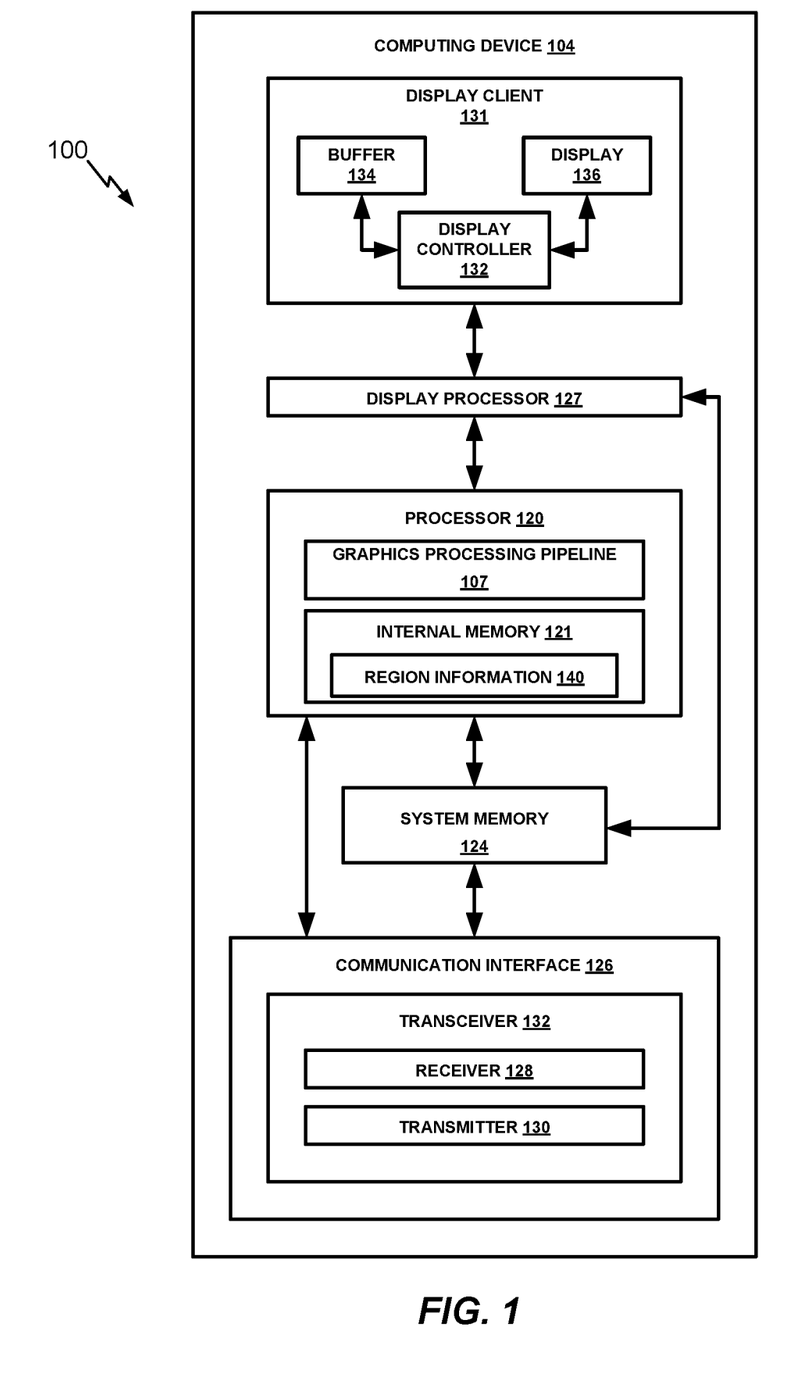
FIG. 1 is a block diagram that illustrates an example computing device configured to dynamically generate a virtual mask layer for a cutout region, in accordance with one or more techniques of this disclosure.

FIG. 1 is a block diagram that illustrates an example system 100 that includes an example computing device 104 configured to dynamically generate a virtual mask layer for a cutout region, in accordance with one or more techniques of this disclosure. The computing device 104 may include one or more components or circuits for performing various functions described herein. In some examples, one or more components of the computing device 104 may be components of an SOC. The computing device 104 may include one or more components configured to perform one or more techniques of this disclosure. In the example shown, the computing device 104 may include a processor 120 and a system memory 124.

In some examples, the computing device 104 can include a number of additional or alternative components, e.g., a communication interface 126, a transceiver 132, a receiver 128, a transmitter 130, a display processor 127, and a display client 131. Reference to the display client 131 may refer to one or more displays. For example, the display client 131 may include a single display or multiple displays. The display client 131 may include a first display and a second display, or a foldable or separable display. In other examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The processor 120 may include an internal memory 121. The processor 120 may be configured to perform graphics processing, such as in a graphics processing pipeline 107. In some examples, the computing device 104 may include a display processor or display processing unit, such as the display processor 127, to perform one or more display processing techniques on one or more frames generated by the processor 120 before presentment by the display client 131. The display processor 127 may be configured to perform display processing. For example, the display processor 127 may be configured to perform one or more display processing techniques on one or more frames generated by the processor 120. The display processor 127 may output image data to the display client 131 according to an interface protocol, such as, for example, the MIPI DSI (Mobile Industry Processor Interface, Display Serial Interface).

The display client 131 may be configured to display or otherwise present frames processed by the display processor 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

In the illustrated example of FIG. 1, the display client 131 includes a display controller 132, a buffer 134, and a display 136. The example display 136 includes a plurality of pixel elements for displaying image data. The display controller 132 may receive image data from the display processor 127 and store the received image data in the buffer 134. In some examples, the display controller 132 may output the image data stored in the buffer 134 to the display 136. Thus, the buffer 134 may represent a local memory to the display client 131. In some examples, the display controller 132 may output the image data received from the display processor 127 to the display 136.

Figure 2:
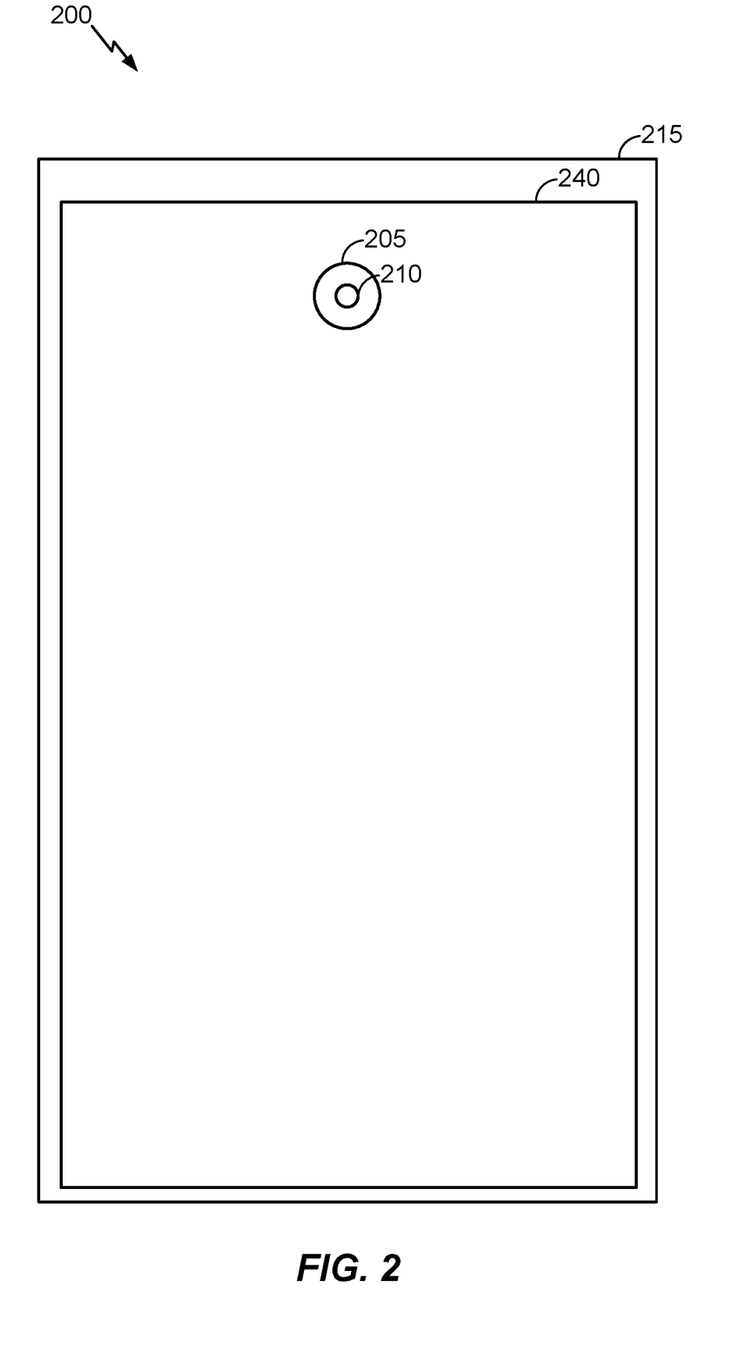
FIG. 2 illustrates an example display panel implementing a technique for generating a virtual mask layer, in accordance with one or more techniques of this disclosure.

In certain aspects the display 136 includes a region that does not have functional pixels. For example, the region of the display 136 may be physically cutout from the display 136. One such example is shown in FIG. 2, where the display panel 240 includes a cutout region 205 that allows light to reach the front camera 210. The display panel 240 belongs to an example smartphone 215 of a computing system 200. In some situations, such as shown in FIG. 2, the display panel 240 may have a mask layer that fully overlaps with the cutout region 205 when the cutout region 205 is within design tolerance, for example, such as within three-pixel variation from the design specification (e.g., in terms of dimension, shape, and position). In other situations, however, the cutout region varies from the design specification and the disclosed mask layer adaptively adjusts to such variation, as further described below in FIGS. 3A and 3B.

Furthermore, as disclosed above, the display client 131 may be configured in accordance with MIPI DSI standards. The MIPI DSI standard supports a video mode and a command mode. In examples where the display client 131 is operating in video mode, the display processor 127 may continuously refresh the graphical content of the display client 131. For example, the entire graphical content may be refreshed per refresh cycle (e.g., line-by-line).

In examples where the display client 131 is operating in command mode, the display processor 127 may write the graphical content of a frame to the buffer 134. In some such examples, the display processor 127 may not continuously refresh the graphical content of the display client 131. Instead, the display processor 127 may use a vertical synchronization (Vsync) pulse to coordinate rendering and consuming of graphical content at the buffer 134. For example, when a Vsync pulse is generated, the display processor 127 may output new graphical content to the buffer 134. Thus, the generating of the Vsync pulse may indicate when current graphical content at the buffer 134 has been rendered.

Memory external to the processor 120, such as system memory 124, may be accessible to the processor 120. For example, the processor 120 may be configured to read from and/or write to external memory, such as the system memory 124. The processor 120 may be communicatively coupled to the system memory 124 over a bus. In some examples, the processor 120 and the system memory 124 may be communicatively coupled to each other over the bus or a different connection.

It should be appreciated that in some examples, the computing device 104 may include a content encoder/decoder configured to receive graphical and/or display content from any source, such as the system memory 124 and/or the communication interface 126. The system memory 124 may be configured to store received encoded or decoded content. In some examples, the content encoder/decoder may be configured to receive encoded or decoded content, e.g., from the system memory 124 and/or the communication interface 126, in the form of encoded pixel data. In some examples, the content encoder/decoder may be configured to encode or decode any content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory. In certain aspects, the internal memory 121 may further include region information 140 indicative of dimensions of a region and a position of a region on the display without functional pixels.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the computing device 104 and moved to another device. As another example, the system memory 124 may not be removable from the computing device 104.

The processor 120 may be a central processing unit (CPU), a graphics processing unit (GPU), a general purpose GPU (GPGPU), or any other processing unit that may be configured to perform graphics processing. In some examples, the processor 120 may be integrated into a motherboard of the computing device 104. In some examples, the processor 120 may be present on a graphics card that is installed in a port in a motherboard of the computing device 104, or may be otherwise incorporated within a peripheral device configured to interoperate with the computing device 104. The processor 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processor 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors. In some aspects, the processor 120 may include or may integrate with the display processor 127.

In some aspects, the content generation system 100 can include a communication interface 126. The communication interface 126 may include a receiver 128 and a transmitter 130. The receiver 128 may be configured to perform any receiving function described herein with respect to the computing device 104. Additionally, the receiver 128 may be configured to receive information, e.g., eye or head position information, rendering commands, or location information, from another device. The transmitter 130 may be configured to perform any transmitting function described herein with respect to the computing device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the computing device 104.

In some examples, the graphical content from the processor 120 for display via the display client 131 is not static and may be changing. Accordingly, the display processor 127 may periodically refresh the graphical content displayed via the display client 131. For example, the display processor 127 may periodically retrieve graphical content from the system memory 124, where the graphical content may have been updated by the execution of an application (and/or the processor 120) that outputs the graphical content to the system memory 124.

It should be appreciated that while shown as separate components in FIG. 1, in some examples, the display client 131 (sometimes referred to as a "display panel") may include the display processor 127.

As shown in FIG. 1, in certain aspects, the display processor 127 (also referred to as a display processing unit (DPU)) may be configured to operate functions of the display client 131. For example, in certain aspects, the display processor 127 is configured to output a plurality of code words, such as corresponding to a frame, to the display controller 132. Each code word may be represented by a binary number in the digital domain. Each code word may correspond to a pixel (e.g., red, green, blue, white, etc.) of the display 136.

The display controller 132 may be configured to convert the code words received from the display processor 127 to analog signals used to drive the pixels of the display 136. In certain aspects, for each code word corresponding to a pixel, the display controller 132 is configured to convert the code word to an analog signal(s) that drives the pixel to a particular brightness level. Accordingly, in certain aspects, the code word and/or analog signal(s) correspond to a brightness level for the pixel.

In certain aspects, the processor 120, the display processor 127, or both, may be configured to produce a mask layer on the display 136 to hide manufacturing defects. The following description uses the processor 120 as an example, and similar techniques, methods, or processes performed by the processor 120 may also be performed in the display processor 127 or in combination therewith.

In certain aspects, the processor 120 is configured to retrieve, from a non-volatile memory, such as internal memory 121 or system memory 124, the region information 140. The region information 140 may be indicative of dimensions of the cutout region in the display 136, such as, for example, the cutout regions 205 of the display panel 240 in FIG. 2 or the cutout regions 305 of FIGS. 3A and 3B. In certain aspects, the computing device 104 may further include a camera positioned under the region in the display 136, such as the camera 210 of FIG. 2 or the camera 310 of FIGS. 3A and 3B. In certain aspects, the processor 120 is configured to receive the region information 140 from a second computing device and store the region information 140 in the non-volatile internal memory 121. In certain additional aspects, the region information 140 may be specific to the computing device 104. For example, the region information 140 may account for both the physical removal of materials in the display 136 and the positioning of the front camera (not shown in FIG. 1) behind the region.

The region information may be indicative of dimensions and position of the region on the display 136, or may include other information fully describing the geometry or condition of the region on the display 136 (e.g., burr, crack, etc.). For example, the region information may include the dimensions of the region and the position of the region. In certain aspects, the region information may include a mask layer based on the dimensions of the region and the position of the region.

The processor 120 is configured to generate a mask layer having a size, shape, and position based on the retrieved region information. For example, the processor 120 may be configured to generate a mask layer that encloses the region that does not have functional pixels. In some instances, the region may be meant to be a round circle punched for housing a front camera and may not have a round edge due to tool wearing. The generated mask layer may have a same round shape but a slightly larger diameter to hide the edge defect of the region. In other instances, the region may be offset to a direction due to slight misalignment between the display panel and the machining tool (e.g., a punching machine, a milling machine, a laser engraver, or the like). The generated mask layer may adjust to the same offset direction and visually hide the misalignment. Other settings for generating the mask layer maybe provided. For example, the mask layer may have a different shape than the shape of the region, such as a square sized to fully cover a circular shape of the region.

In certain aspects, the processor 120 may compose an image based on the mask layer and one or more layers. The mask layer is configured to prevent display of any portion of the one or more layers that overlap with the mask layer. The one or more layers may be rendered to generate a frame by a graphics processing unit, such as the graphics processing pipeline 107. The processor 120 may then output the image on the display 136.

In certain aspects, the processor 120 may be configured to generate a second mask layer based on the region information. The processor 120 may compose a second image based on at least the second mask layer. The processor 120 may output the second image on the display 136.

Figure 3A:
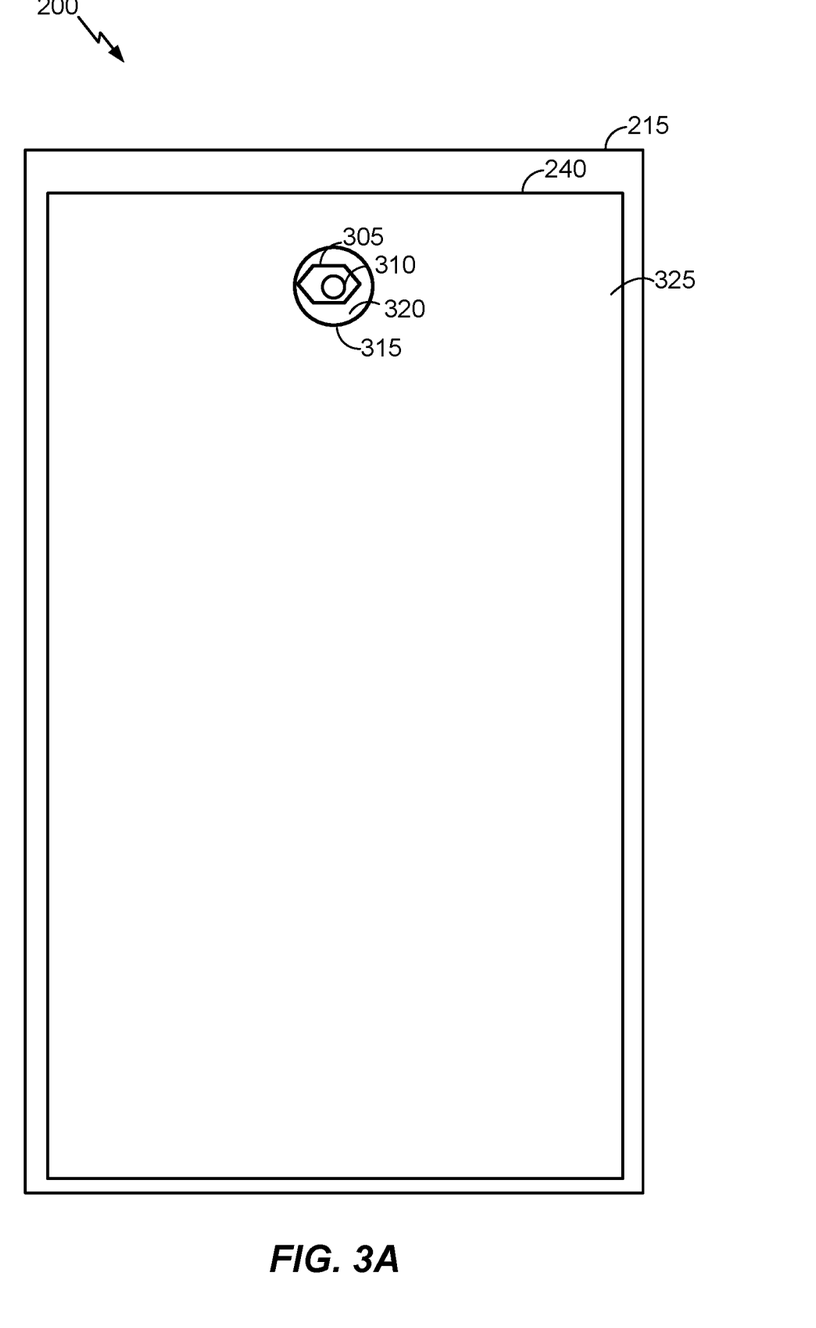
FIGS. 3A and 3B illustrate another example display panel implementing a technique for generating a virtual mask layer, in accordance with one or more techniques of this disclosure.
Figure 3B:
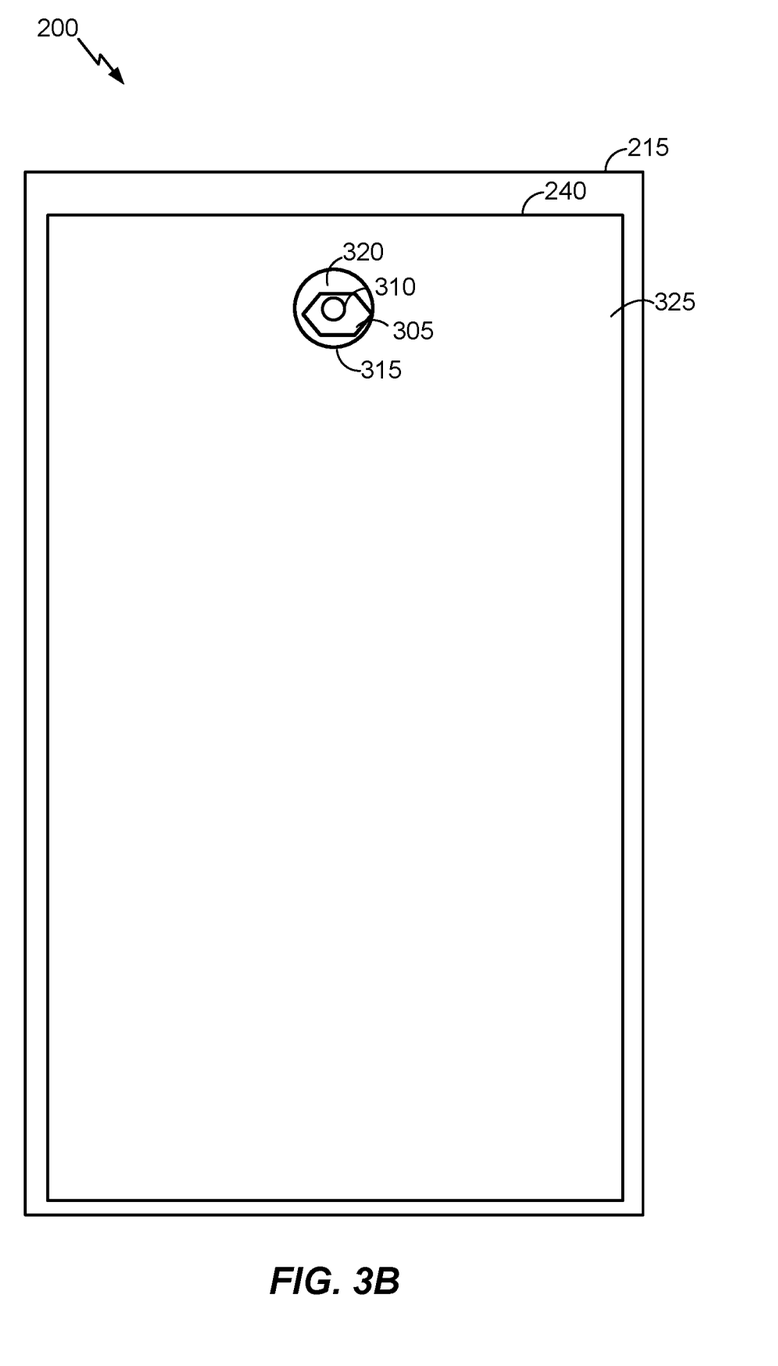

In certain aspects, the mask layer generated by the processor 120 may be dynamically adjusted for cutout regions that are physically removed from the display 136. In an ideal situation, as illustrated in FIG. 2, the region 205 of the display panel 240 may be of an exact shape, size, and location as desired, and thus overlapping with the mask layer. For example, when the region 205 is within three pixels of difference (or any other specified error tolerance) compared to a target design specification, the processor 120 may determine that a default mask layer that overlaps with the region 205 without adjustment can be used. In more practical situations, such as illustrated in FIGS. 3A and 3B, various manufacturing errors may occur, causing defects in shape, size, and/or position, of the region 305, which is meant to share a center with the camera 310, have a circular shape, and sized slightly larger than the camera 310. For example, in manufacturing, the size and shape of the region 305 may change as the tooling wears. The position of the region 305 may be subject to random errors occurred during placing each display panel under the tooling.

As shown in FIGS. 3A and 3B, the regions 305 have different positions and sizes. The processor 120 may receive region information 140 indicative of dimensions and position of the regions 305. For example, the regions 305 may be measured using a microscope (not shown) when the display panel 240 has all the functional pixels 325 powered on. The microscope may record the non-functional pixels of the regions 305 and determine key geometric parameters of the regions 305. The key geometric parameters may include one or more of shape, dimensions, deviation, position, center, and/or other values or information needed for the processor 120 to generate the mask layer 315. In certain aspects, these key geometric parameters, an in certain aspects along with any post-processed results (such as area, size, etc.) may form the region information 140. In certain aspects, the region information 140 may be stored directly in the internal memory 121 upon measurement or transferred thereafter from the microscope (or other measurement equipment) to the internal memory 121. In certain aspects, the key geometric parameters may be used by another device to generate a mask layer, such as mask layer 315, and the region information 140 may comprise the mask layer itself.

The processor 120, or another suitable device, may be configured to generate the mask layer 315 based on the measured region information of the region 305. For example, the mask layer 315 may be required to have a smallest possible area to completely cover the region 305, to achieve a minimal overall size on the display panel 240. In other instances, the mask layer 315 may be required to be concentric with the camera 310, whose position may be measured or presumed to be at a constant position relative to the edges of the display panel. In some other instances, the mask layer 315 may be required to have a shape symmetric around the center of the camera 310. In still some other instances, the mask layer 315 may be required to have a smooth edge as defined by a rounding radius threshold. In yet some other instances, the mask layer 315 may be required to adjust its size, shape, and position based on user or application specific criteria and based on the region information 140.

As shown in FIG. 3A, the mask layer 315 is concentric with the camera 310, fully encompasses the region 305, and forms a round circle with smooth edges. The functional pixels of area 320 inside the region 305 may be powered off to display a black or dark color during operation to simulate a conventional mask layer. The processor 120 is configured to compose an image based on the mask layer 315 and other layers associated with operations of the computing device 104, such that the mask layer 315 prevents the pixels in the area 320 from displaying the other layers. The processor 120 is configured to compose an image for the mask layer 315 specific to the display panel 240 of FIG. 3A and save the image in the computing device 104.

Similarly, as shown in FIG. 3B, even though the region 305 has a different size and position than the region 305 of FIG. 3A, the mask layer 315, meeting the same set of requirements regarding size, shape, and location, still fully covers the region 305. Both the black spaces in the region 305 and the unpowered pixels in the area 320 look black in appearance. The mask layer 315 thus successfully hides the errors and defects during manufacturing. In certain aspects, the processor 120 is configured to compose a different image for the mask layer 315 specific to the display panel 240 of FIG. 3B but to achieve the same aperture appearance as the mask layer 315 of FIG. 3A. In some embodiments not shown, the region 305 may require an adjustment that alters the size of the mask layer 315, such as when the region 305 is further offset from the camera 310 and requiring an increased mask layer size to fully cover the region 305. Similarly, the processor 120 may generate a mask layer 315 that always seems in contact with region 305 for minimizing the size of the mask layer 315.

As described herein, a device, such as the computing device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 4:
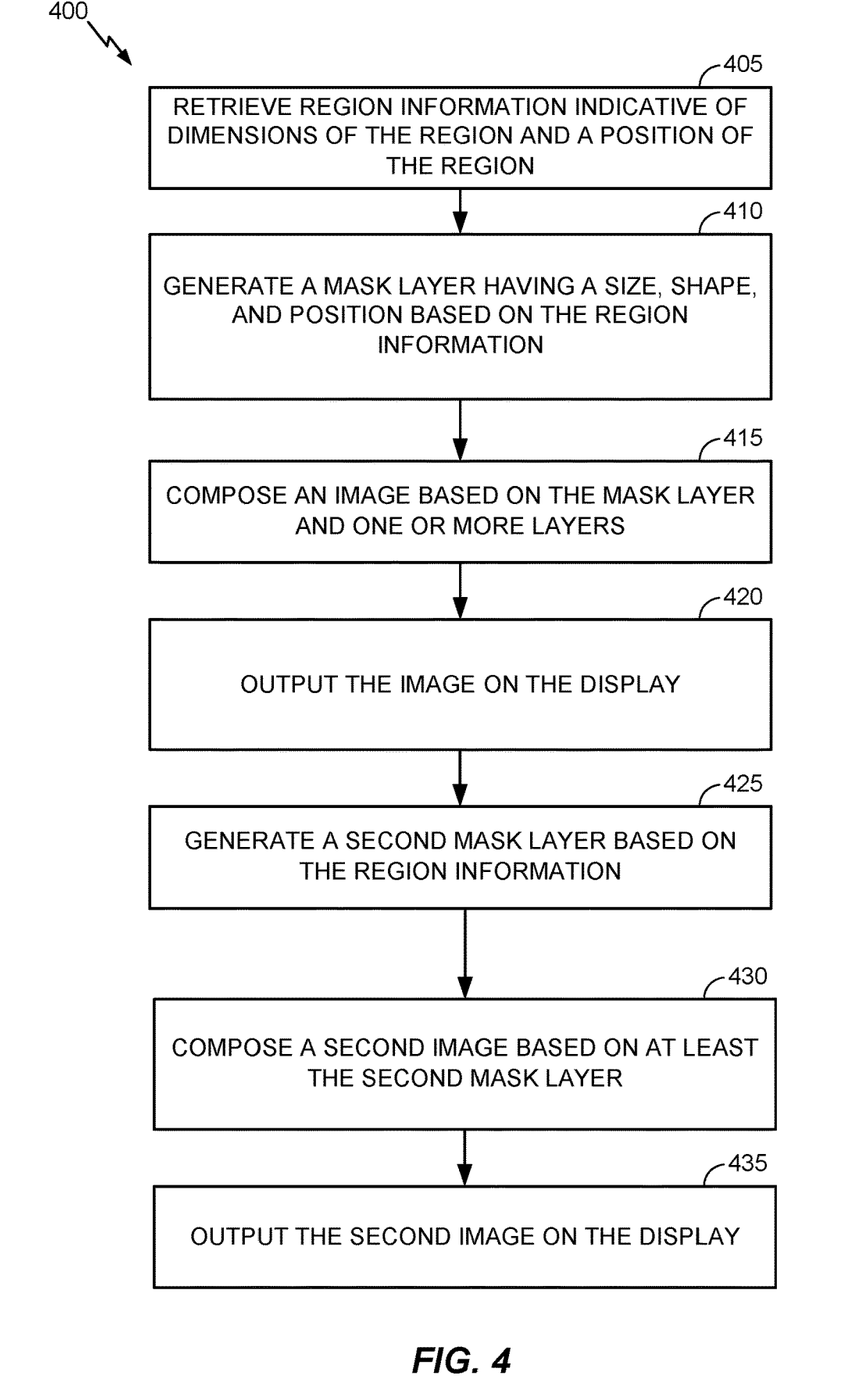
FIG. 4 illustrates example operations for a computing device generating a virtual mask layer for a cutout region of a display panel, according to certain aspects of the present disclosure.

FIG. 4 illustrates example operations 400 for a computing device generating a virtual mask layer for a cutout region of a display panel, according to certain aspects of the present disclosure. The example operations 400 may be performed on a computing device or a computing system. In some embodiments, the computing device includes an integral display; the computing system may include an external display. The example operations 400 may be performed by various components forming the computing device or computing system, even if such various components may be far apart. As shown in FIG. 4, at 405, region information may be retrieved. The region information may be indicative of dimensions of a region of a display panel. The region may not have functional pixels. In some instances, the region may be physically cutout from the display panel. The region information may be retrieved from a local memory, or may be transferred from a storage space external to the computing device or computing system, such as from a server, a cloud, or other network systems. In some embodiments, the region information includes the dimensions of the region and the position of the region.

At 410, a mask layer is generated, for example, by a processor or a processing unit of the computing device or computing system. The mask layer may include a size, shape, and position based on the retrieved region information. For example, the mask layer may be as small as possible while sufficient to cover the cutout region in the display panel. In some embodiments, the mask layer may be generated according to certain programmed or user-entered preferences, rules, or algorithms. For example, the mask layer may be required to be concentric with the front camera under the display panel and through the cutout region, have a symmetric shape, and a pre-defined rounding radius, etc. These preferences, rules, or algorithms may ensure that the generated mask layer provides an aesthetic look on the display panel and hides manufacturing defects of the region.

At 415, an image is composed based on the mask layer and one or more layers. The mask layer prevents display of any portion of the one or more layers that overlap with the mask layer. In some embodiments, the mask layer includes functional pixels that constantly display black (or the darkest settings) on the display panel to simulate a conventional mask layer achieved using black paint or the like. The composed image may display black, pure black, a shade, or a color of the portion of the one or more layers that overlap with the mask layer. At 420, the composed image is output on the display panel.

In some embodiments, optionally, a second mask layer may be generated at 425 based on the region information. For example, the second mask layer may be applicable to different software applications, environment (e.g., temperature and humidity), or lighting conditions (such as, for example, based on measurements of the region based on different lighting conditions). Optionally, at 430, a second image may be composed based on the second mask layer. The second composed image may be based on the second mask layer and one or more other layers. The second mask layer prevents display of any portion of the other one or more layers that overlap with the second mask layer. Optionally, at 435, the second image may be output to the display.

Figure 5:
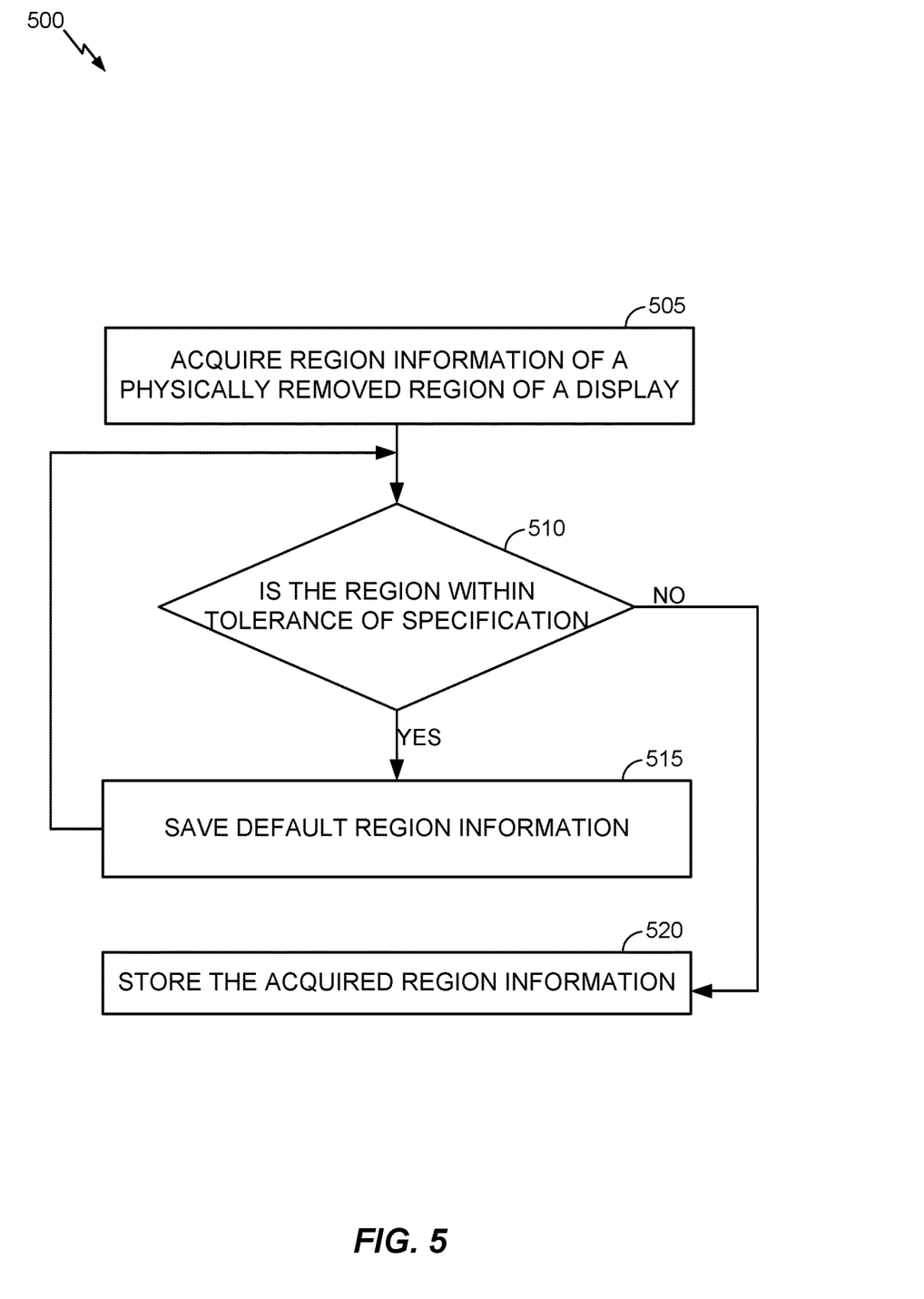
FIG. 5 illustrates example operations for a production system providing an acquired region information for the computing device to generate a virtual mask layer of FIG. 4.

FIG. 5 illustrates example operations 500 for a production system providing an acquired region information for the computing device to generate a virtual mask layer of FIG. 4. For example, the example operations 500 may be performed in a production line of display panels or the computing devices that include the display panels. At 505, region information of a physically removed region of a display is acquired. The physically removed region of a display (or display panel) may be a punch hole of the material forming the display, or in applicable embodiments, forming the backlight of the display. A microscope, scanner, or a high-resolution optical system that is operable to measure sub-pixel dimensions of the display panel may be used to measure the cutout region.

In some embodiments, the local high-resolution measurement of the cutout region may be combined with the location of the region and the overall dimensions of the display panel measured by an overall positioning system, which can accurately measure the larger overall dimensions but cannot measure at sub-pixel resolution of the cutout region. In other embodiments, the optical system may be configured to obtain both the overall dimension and position of the region, as well as the sub-pixel information of the region. For example, the display panel may be powered on and lit up during measurements, to contrast the region that does not have functional pixels. Such contrast enables the microscope, scanner, or other optical systems to record the shape, dimension, and location of the cutout region into the region information.

At 510, whether the acquired region is within a tolerance of the design specification is determined. For example, the manufacturing line may define an error tolerance corresponding to a conformance rate. When the measured cutout region is within the error tolerance of the design specification, such as, for example, within three pixels of variation, then a default region information may be saved at 515. For example, the default region information may be used in ideal situations, such as the one illustrated in FIG. 2 where the mask layer fully overlaps with the region. Upon saving the default region information, the operations 500 moves on with a next display panel to have its region measured.

When the measured region is not within the error tolerance of the design specification, such as, having different dimensions, position, or both, the acquired region information is separately stored specific to the display panel being measured. For example, the disclosed techniques may record the region information for each display panels to record device specific data for device specific adjustments. In some embodiments, the acquired region information is saved at a server and later transferred to individual computing devices that match the corresponding region information. In other embodiments, the acquired region information is directly saved at the individual computing devices that has the display panel installed. Upon storing the acquired region information, the operation 500 may move on with a next display panel and continue the measurement process.

In certain aspects of operations 500, different methods may be used to obtain the actual punch-hole shape and position for each computing device. One typical method may include powering on the full screen to maximum brightness, and capturing the display using a high-resolution camera.

In certain aspects of operations 500, a server may use the captured image of the display as an input. The server may generate a mask of the exact hole shape and transfer the mask to the computing device, such as, for example, a smart phone, a tablet, or a laptop computer. In some embodiments, the server may further perform post-processing and generate device-specific diameter and position for each measured region, in order to perfectly cover the actual region. The server may then transfer the image of the mask layer to the computing device.

In one configuration, a method or apparatus for display processing is provided. The apparatus may be a processing unit, a display processor, a display processing unit (DPU), a graphics processing unit (GPU), a video processor, or some other processor that can perform display processing. In some examples, the apparatus may be the processor 120 within the computing device 104, or may be some other hardware within the computing device 104, or another device.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A computing device comprising:
    a display comprising a region including pixels;
    a non-volatile memory; and
    a processor configured to:
        retrieve, from the non-volatile memory, region information indicative of dimensions of the region, a position of the region on the display, and a cutout region of the display;
        generate a mask layer having a size, shape, and position based on the region information, wherein the size, shape, and position of the mask layer are further based on the cutout region;
        compose an image based on the mask layer and one or more layers, wherein the mask layer prevents display of at least one first portion of the one or more layers that overlaps with the mask layer, and wherein the cutout region allows display of at least one second portion of the one or more layers that overlaps with the cutout region;
        output the image on the display; and
        receive the region information from a second computing device and store the region information in the non-volatile memory,
    wherein the region information comprises the dimensions of the region and the position of the region, and
    wherein the non-volatile memory includes the region information indicative of dimensions of the region and the position of the region without functional pixels.

2. The computing device of claim 1, wherein the region information comprises a mask based on the dimensions of the region and the position of the region.

3. The computing device of claim 1, wherein the processor is further configured to:
    generate a second mask layer having a size, shape, and position based on the region information, wherein the size, shape, and position of the second mask layer are further based on the cutout region;
    compose a second image based on the second mask layer and one or more second layers, wherein the second mask layer prevents display of at least one first portion of the one or more second layers that overlaps with the second mask layer, and wherein the cutout region allows display of at least one second portion of the one or more second layers that overlaps with the cutout region; and
    output the second image on the display.

4. The computing device of claim 1, further comprising a camera positioned under the region of the display.

5. The computing device of claim 1, wherein the processor comprises a display processing unit.

6. The computing device of claim 1, wherein the region information is specific to the computing device.

7. The computing device of claim 1, wherein the mask layer fully overlaps with the region.

8. The computing device of claim 1, wherein the region is physically cutout from the display.

9. The computing device of claim 1, wherein the processor is further configured to adjust the mask layer based on the cutout region.

10. A method of display processing at a computing device, the computing device including a display comprising a region including pixels, comprising:
 retrieving region information indicative of dimensions of the region, a position of the region on the display, and a cutout region of the display;
 generating a mask layer having a size, shape, and position based on the region information, wherein the size, shape, and position of the mask layer are further based on the cutout region;
 composing an image based on the mask layer and one or more layers, wherein the mask layer prevents display of at least one first portion of the one or more layers that overlaps with the mask layer, and wherein the cutout region allows display of at least one second portion of the one or more layers that overlaps with the cutout region;
 outputting the image on the display; and
 receiving the region information from a second computing device and storing the region information in a non-volatile memory of the computing device,
 wherein the region information comprises the dimensions of the region and the position of the region, and
 wherein the non-volatile memory includes the region information indicative of dimensions of the region and the position of the region without functional pixels.

11. The method of claim 10, wherein the region information comprises a mask based on the dimensions of the region and the position of the region.

12. The method of claim 10, further comprising:
 generating a second mask layer having a size, shape, and position based on the region information, wherein the size, shape, and position of the second mask layer are further based on the cutout region;
 composing a second image based on the second mask layer and one or more second layers, wherein the second mask layer prevents display of at least one first portion of the one or more second layers that overlaps with the second mask layer, and wherein the cutout region allows display of at least one second portion of the one or more second layers that overlaps with the cutout region; and
 outputting the second image on the display.

13. The method of claim 10, wherein the region information is specific to the computing device.

14. The method of claim 10, wherein the mask layer fully overlaps with the region.

15. The method of claim 10, wherein the region is physically cutout from the display.

16. The method of claim 10, further comprising adjusting the mask layer based on the cutout region.

* * * * *